(12) United States Patent  
Cox

(10) Patent No.: US 6,631,040 B1
(45) Date of Patent: Oct. 7, 2003

(54) METHOD AND APPARATUS FOR EFFECTING TEMPERATURE COMPENSATION IN AN OPTICAL APPARATUS

(75) Inventor: Phillip A. Cox, Highland Village, TX (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 10/143,710

(22) Filed: May 8, 2002

(51) Int. Cl.[7] .................................................. G02B 7/02
(52) U.S. Cl. ...................................... 359/820; 359/819
(58) Field of Search ................................ 359/820, 823, 359/829, 830, 811; 396/526; 362/455; 353/100

(56) References Cited

U.S. PATENT DOCUMENTS 4,068,697 A * 1/1978 Schiaffino .................. 411/270
4,850,674 A * 7/1989 Hasselskog ................. 359/820

* cited by examiner

Primary Examiner—Hung Xuan Dang
Assistant Examiner—Joseph Martinez
(74) Attorney, Agent, or Firm—Baker Botts L.L.P.

(57) ABSTRACT

An optical apparatus (10, 310) includes a housing (12) having a lens support (51, 321) moveably supported therein. An athermalization part (121, 341) is coupled at one end to the housing and at the other end to the lens support, in order to effect movement of the lens support relative to the housing in response to a temperature variation. This coupling includes coupling structure (148, 348) on the athermalization part which engages coupling structure (27, 327) on the housing or lens support, and these coupling structures are resiliently urged into engagement with each other in a manner that facilitates a zero backlash condition.

15 Claims, 7 Drawing Sheets

METHOD AND APPARATUS FOR EFFECTING TEMPERATURE COMPENSATION IN AN OPTICAL APPARATUS

TECHNICAL FIELD OF THE INVENTION

This invention relates in general to temperature compensation in an apparatus and, more particularly, to a method and apparatus for effecting temperature compensation in an optical apparatus using a passive athermalization component to effect relative movement of different components.

BACKGROUND OF THE INVENTION

An optical apparatus usually needs to operate reliably and accurately over a relatively wide temperature range. However, changes in temperature can affect optical characteristics of the apparatus. For example, where an optical apparatus has infrared-transmissive lenses made of a material such as germanium, the index of refraction of the lenses will change fairly significantly in response to a temperature change. Absent compensation, the change in the index of refraction can produce problems such as shifting of a focal plane relative to a sensor or some other component, thereby degrading the accuracy of the focusing function provided by the lenses.

In attempt to provide appropriate temperature compensation to avoid such problems, various techniques have previously been used. One such approach involves active focus compensation through use of temperature sensors, a closed loop control system responsive to the sensors, and motor-driven positioners that reposition the lenses under control of the control system. However, this type of approach is complex, and therefore cost prohibitive for many applications. Further, the complexity gives this system a level of reliability which is less than desirable.

Another known compensation approach effects passive repositioning of lenses through use of materials having different coefficients of thermal expansion. As the ambient temperature changes, the materials change dimensionally at different rates, in a manner which repositions the lenses so as to maintain a sharp focus. Prior systems of this type have included components such as fluid-filled bellows, bimetallic springs, and high expansion rate plastics. However, various additional parts are typically needed in order to address other considerations. For example, separate loading springs are provided to control backlash and maintain stiffness in vibration and shock environments. Further, separate parts are provided in order to achieve initial focus adjustment. In addition, these approaches often involve many parts that must be assembled, high-precision fabrication, and separate locking parts, compounds or processes. Therefore, as a whole, these approaches are fairly complex, and thus cost prohibitive for many applications.

A related consideration is that, in many prior approaches, setscrews are used to clamp and lock concentric assemblies, for example to maintain initial focus adjustment. However, the setscrews may tend to loosen over time. Further, the setscrews can deform threads on other structures, which can make it difficult or impossible to subsequently readjust the initial focus setting, and which can increase the binding between parts. Also, temperature changes may alter dimensional characteristics of various parts in a manner that effectively loosens the grip provided by the setscrews.

SUMMARY OF THE INVENTION

From the foregoing, it may be appreciated that a need has arisen for a better method and apparatus for effecting passive temperature compensation within an optical apparatus. According to the present invention, a method and apparatus are provided to address this need, and involve: supporting first and second parts for relative movement parallel to a first direction, the first part including a section having thereon a coupling structure which faces in a second direction approximately transverse to the first direction; providing on one of the first and second parts an optical component which is part of an optical system; and compensating for variation in optical characteristics of the optical system due to temperature changes by providing a compensation part which is operatively coupled to the second part and which includes a section having thereon a coupling structure that faces and operatively engages the coupling structure on the first part, a first of the sections having thereon a first of the coupling structures and a second of the sections having thereon a second of the coupling structures. The compensation part has a coefficient of thermal expansion which causes the compensation part to respond to a temperature change by undergoing a size change that effects relative movement of the first and second parts parallel to the first direction by an amount which compensates for the variation in optical characteristics of the optical system caused by the temperature change, and the first section continuously resiliently urges the first coupling structure against the second coupling structure in a direction approximately parallel to the second direction.

BRIEF DESCRIPTION OF THE DRAWINGS

A better understanding of the present invention will be realized from the detailed description which follows, taken in conjunction with accompanying drawings, in which.

DETAILED DESCRIPTION OF THE INVENTION

Figure 1:
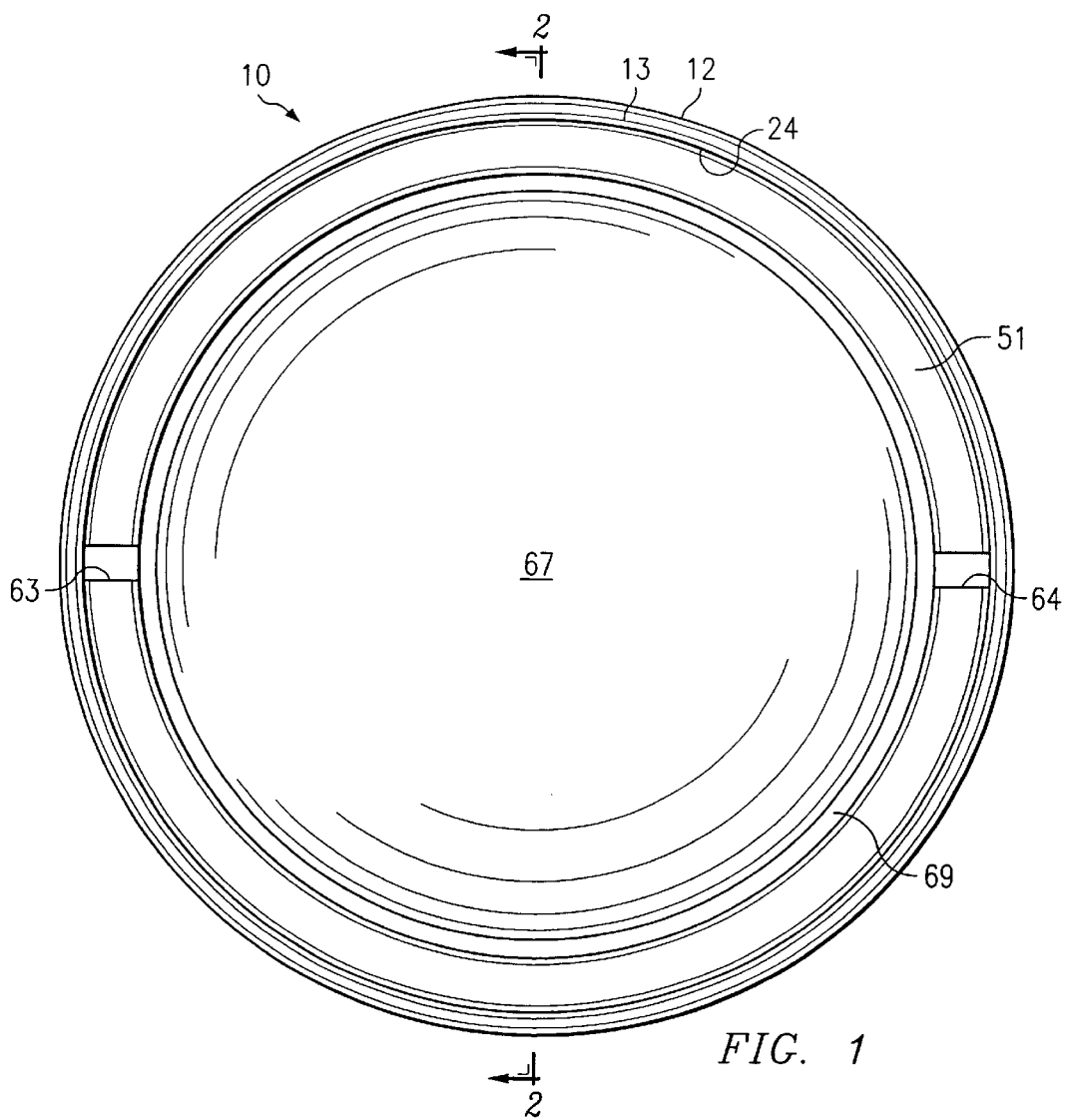
FIG. 1 is a diagrammatic front view of an optical apparatus which embodies aspects of the present invention.
Figure 2:
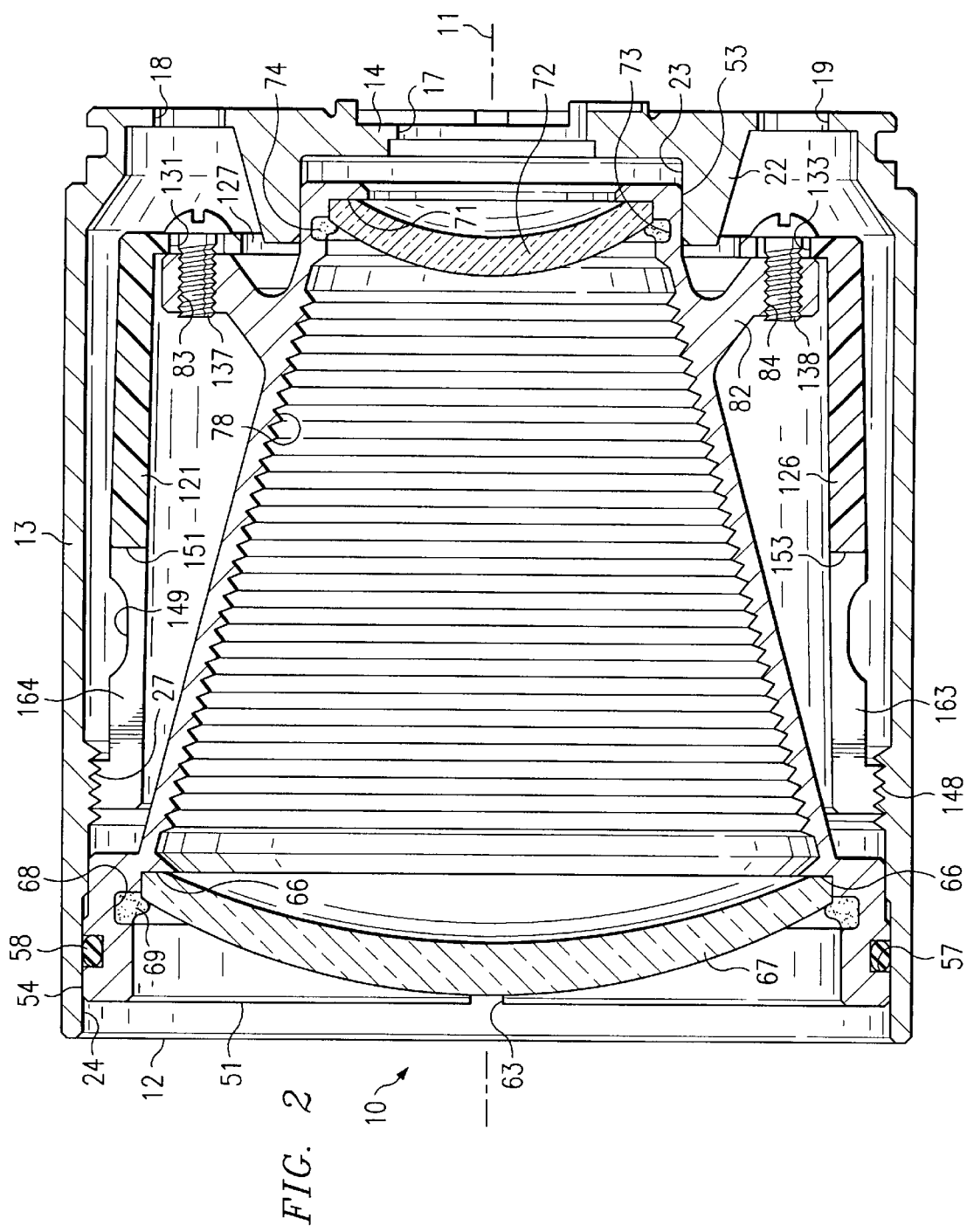
FIG. 2 is a diagrammatic sectional side view of the apparatus of FIG. 1, taken along the section line 2—2 in FIG. 1.

FIG. 1 is a diagrammatic front view of an optical apparatus 10 which embodies aspects of the present invention. FIG. 2 is a diagrammatic sectional side view of the apparatus 10, taken along the section line 2—2 in FIG. 1. The apparatus 10 handles infrared radiation, as discussed later, and has an optical axis which is indicated diagrammatically in FIG. 2 by a broken line 11. The apparatus 10 includes an approximately cup-shaped housing 12. In the disclosed embodiment, the housing 12 is made from an aluminum alloy which is well known in the art, and which is readily commercially available from a number of vendors as aluminum alloy 6061-T6. However, the housing 12 could alternatively be made from some suitable material.

Figure 3:
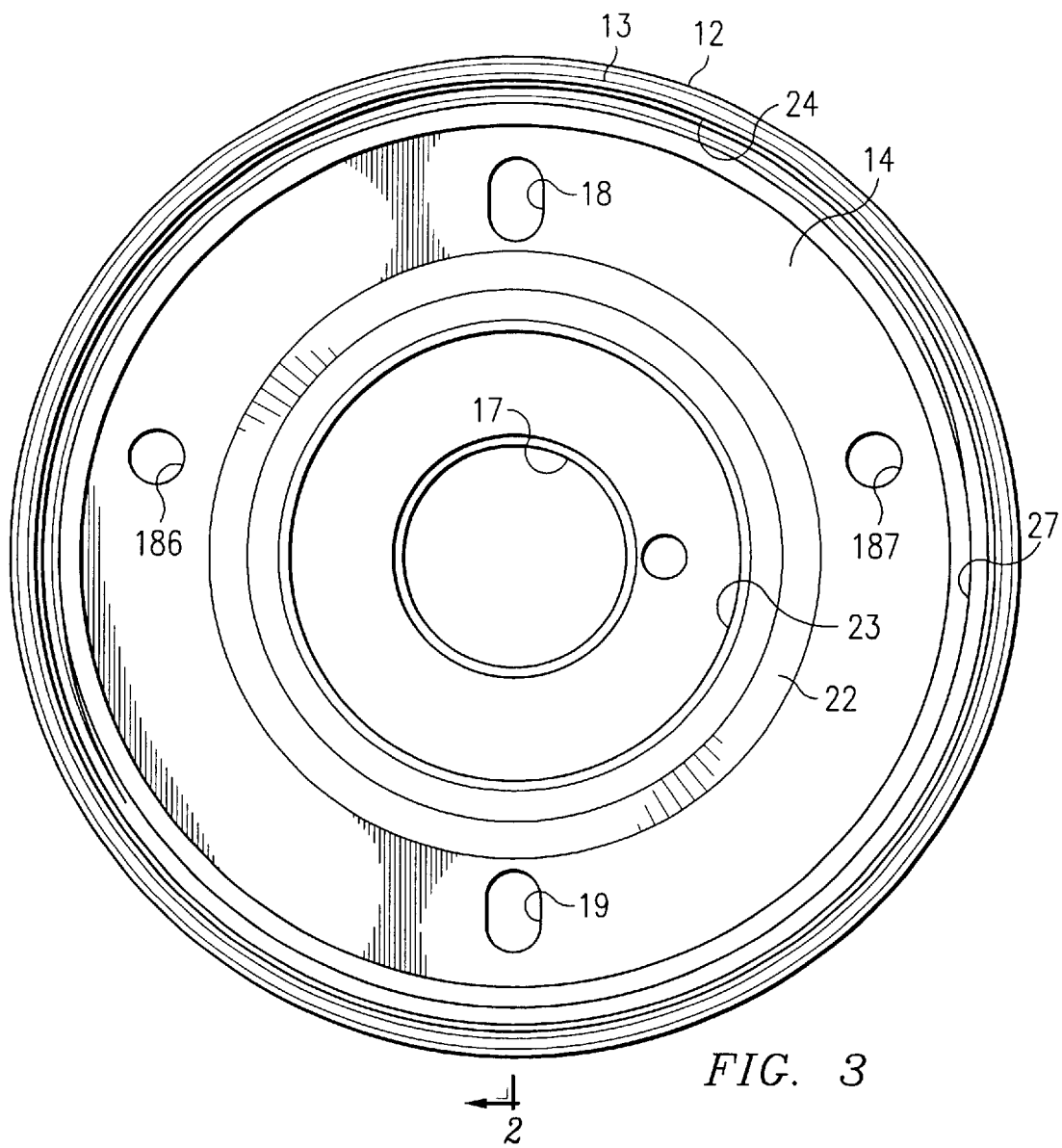
FIG. 3 is a diagrammatic front view of a housing which is a component of the apparatus of FIG. 1.

FIG. 3 is a diagrammatic front view of the housing 12. Referring to FIGS. 2 and 3, the housing 12 has a tubular side wall 13 which is approximately cylindrical, which is concentric to the axis 11, and which has at one end an approximately circular end wall 14. The end wall 14 has a circular opening 17 which extends axially through it, and which is concentric to the axis 11. Two radially extending slots 18 and 19 are provided through the end wall 14 on opposite sides of the opening 17. The end wall 14 also has on an inner side thereof an axially forwardly extending annular projection 22, with a radially inwardly facing cylindrical guide surface 23 thereon. The guide surface 23 is concentric to the axis 11.

The side wall 13 has, near an end remote from the end wall 14, a radially inwardly facing cylindrical guide surface 24, which is concentric to the axis 11. The side wall 13 also has, in the region of the surface 24 and on an axial side thereof nearest the end wall 14, circumferentially extending threads 27 which face radially inwardly. The threads 27 are discussed in more detail later.

With reference to FIGS. 1 and 2, the apparatus 10 also includes a lens support 51. The lens support 51 is tubular, has approximately a frustoconical shape, and is concentric to the axis 11. In the disclosed embodiment, the lens support 51 is made from the same aluminum alloy as the housing 12, but it could alternatively be made from some other suitable material. The lens support 51 has at its smaller end a radially outwardly facing cylindrical guide surface 53, which slidably engages the cylindrical guide surface 23 on the housing 12. At its opposite end, the lens support 51 has a radially outwardly facing cylindrical guide surface 54, which slidably engages the guide surface 24 on the housing 12. Thus, through relative sliding movement of the guide surfaces 23 and 53 and the guide surfaces 24 and 54, the lens support 51 is capable of axial and rotational movement relative to the housing 12. The guide surfaces 23–24 and 53–54 are all precision machined surfaces, in order to deep the lens support 51 and the housing 12 accurately radially aligned with each other during relative movement thereof.

The outer side of the lens support 51 has, in the region of the guide surface 54, a circumferential groove 57. A nitrile rubber O-ring 58 is provided within the groove 57, but the O-ring could alternatively be made of some other suitable resilient material, such as silicon rubber. The O-ring 58 sealingly engages annular surfaces provided on each of the housing 12 and the lens support 51, in order to help resist the entry of moisture, dust or other foreign matter into the apparatus 10. As best seen in FIGS. 1 and 2, the forward end of the lens support 51 has two slot-like recesses 63 and 64 on diametrically opposite sides thereof. A not-illustrated tool can engage the recesses 63 and 64 in order to facilitate manual rotation of the lens support 51 with respect to the housing 12, for a purpose discussed in more detail later.

The lens support 51 has, near the front end thereof, an annular recess or groove 66 which is concentric to the axis 11, and which has axially and radially inwardly facing surfaces. A circular lens 67 has a peripheral edge which is seated in the recess 66, so that an optical axis of the lens 67 is coextensive with the axis 11. The lens support 51 also has, just in front of the recess 66, an annular groove 68. The annular groove 68 contains a potting compound 69 of a type well known to persons skilled in the art. The potting compound 69 extends around and engages the peripheral edge of the lens 67, so as to fixedly hold the lens 67 in place on the lens support 51. In the disclosed embodiment, the lens 67 is designed to refract infrared radiation, and is made of geranium, but could alternatively be made of some other suitable material.

The lens support 51 has, near its rear end, a circumferential recess 71 which is concentric to the axis 11, and which has axially and radially inwardly facing surfaces. A circular second lens 72 has a peripheral edge seated in the recess 71, so that an optical axis of the lens 72 is coextensive with the axis 11. In the disclosed embodiment, the lens 72 is made of the same germanium material as the lens 67, but it could alternatively be made of some other suitable material. The lens support has, just in front of the recess 71, an annular groove 73. The annular groove 73 contains a potting compound 74 which is the same as that used at 69. The potting compound 74 extends around and engages the peripheral edge of the lens 72, so as to fixedly hold the lens 72 in place on the lens support 51.

The lenses 67 and 72 are components of an optical system, and focus infrared radiation so as to form an image at a not-illustrated image plane, which is located slightly to the rear of the end wall 14. The optical system has other components which are not part of the apparatus 10, and which are therefore not illustrated and described here in detail.

In the region between the lenses 67 and 72, the lens support 51 has a radially inwardly facing frustoconical surface, and this frustoconical surface is provided with a thread 78. The thread 78 does not cooperate with threads on another component, but instead serves to reduce or avoid undesirable reflections from the frustoconical interior surface of the lens support 51, including reflections that could degrade the effective operation of the optical system.

The lens support 51 has, near the rear end thereof, a radially outwardly projecting annular flange 82. The flange 82 has four threaded openings which extend axially therethrough, two of these threaded openings being visible at 83 and 84 in FIG. 2. The four threaded openings are disposed at respective locations which are spaced angularly by intervals of 90°.

Figure 4:
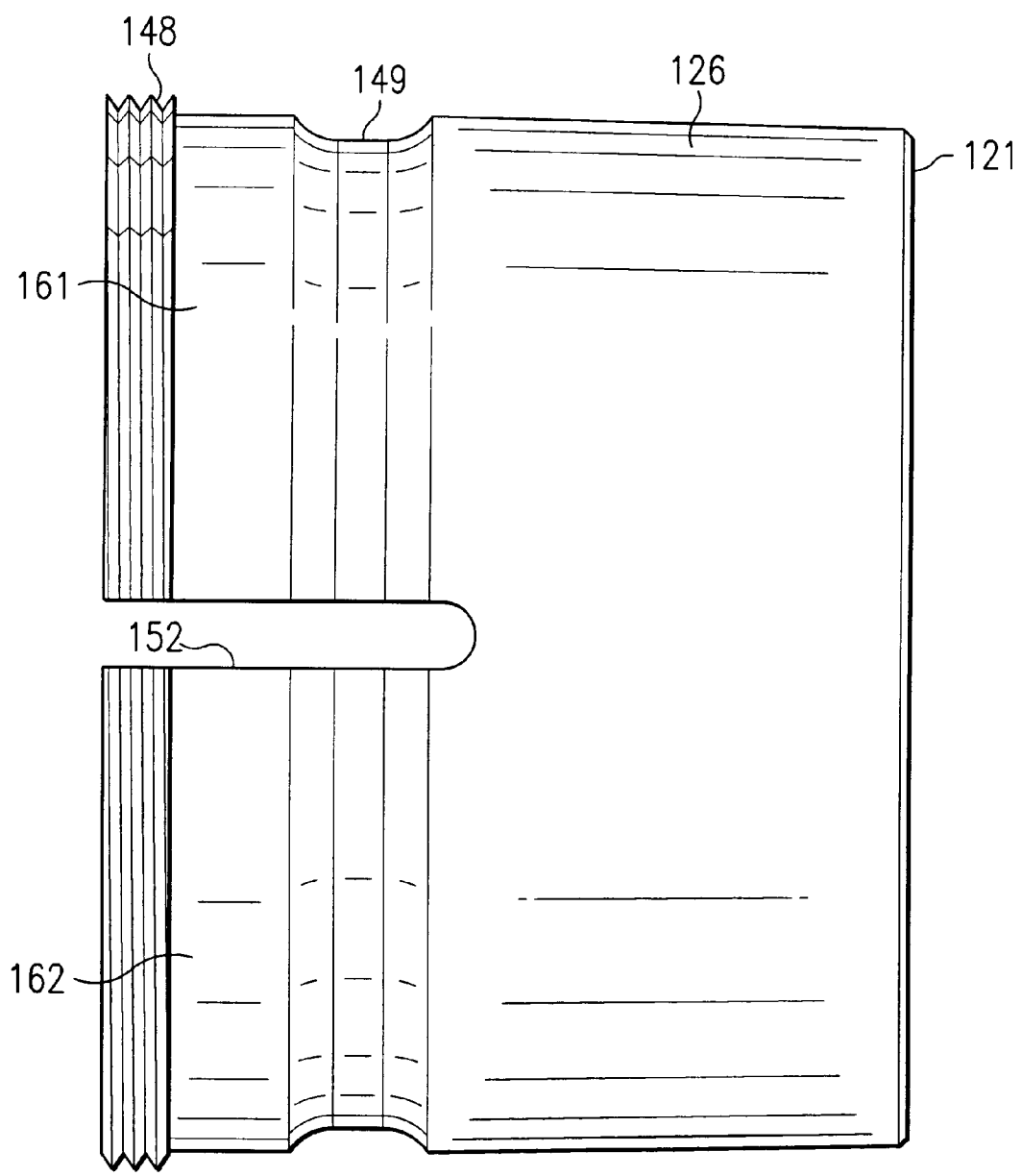
FIG. 4 is a diagrammatic side view of an athermalization part which is a component of the apparatus of FIG. 1.
Figure 5:
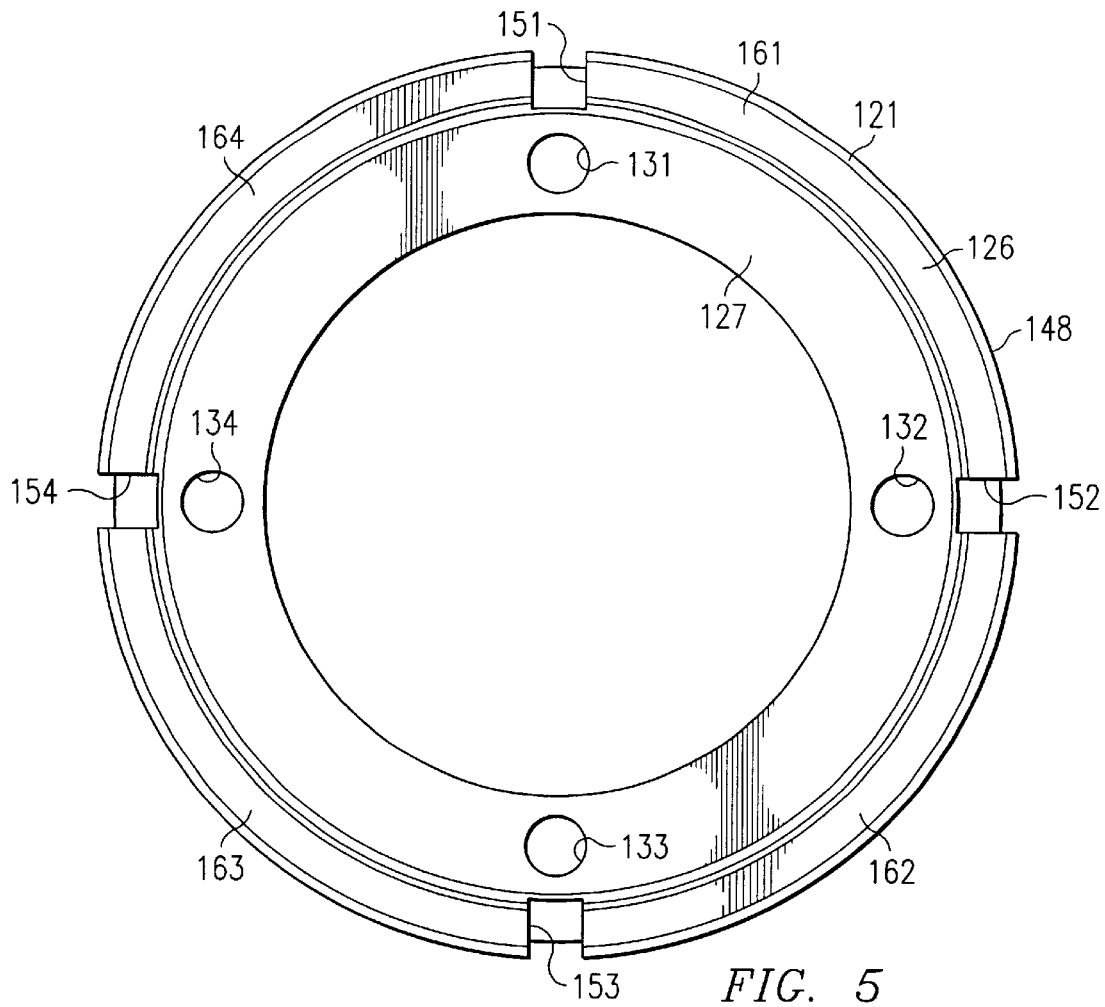
FIG. 5 is a diagrammatic front view of the athermalization part of FIG. 4.

With reference to FIG. 2, the apparatus 10 also includes a tubular athermalization part 121. FIG. 4 is a diagrammatic side view of the athermalization part 121, and FIG. 5 is a diagrammatic front view of the athermalization part 121. The athermalization part 121 effects temperature compensation within the apparatus 10, in a manner described in more detail later. In the disclosed embodiment, the athermalization part 121 is made from an ultra high molecular weight polyethylene (UHMW-PE), which has a relatively high coefficient of thermal expansion. A suitable UHMW-PE material is commercially available under the trademark TIVAR as annealed TIVAR 1000, from Poly Hi Solidur, Inc. of Fort Wayne, Ind. However, the athermalization part 121 could alternatively be made of some other suitable material.

With reference to FIGS. 2, 4 and 5, the athermalization part 121 has a tubular side wall 126 which is concentric to the axis 11. The side wall 126 is approximately cylindrical, but more precisely is frustoconical, in that it tapers very gradually in diameter from its front end to its rear end. At the rear end of the side wall 126, the athermalization part 121 has an annular flange 127 which extends radially inwardly. The flange 127 has four openings 131–134 which extend axially through it, and which are distributed angularly at uniform intervals of 90°.

The flange 127 of the athermalization part 121 is fixedly secured to the flange 82 of the lens support 51 by four screws, two of which are visible at 137 and 138 in FIG. 2. More specifically, these four screws each extend through a respective one of the four openings 131–134 in the flange 127, and each threadedly engage a respective one of the threaded openings in the flange 82. The openings 131–134 each have an inside diameter which is somewhat larger than the outside diameter of the threads on the associated screw, for a purpose discussed later.

On the outer side of its front end, the athermalization part 121 has circumferentially extending threads 148. As shown in FIG. 2, the threads 148 operatively engage the threads 27 provided on the housing 12, in order to physically couple the athermalization part 121 and the housing 12. The threads 27 and 148 are discussed in more detail later. A small axial distance from the threads 148, the outer side of the athermalization part 121 has a shallow and circumferentially extending groove 149. Also, as best seen in FIGS. 4 and 5, four slots 151–154 each extend axially into the athermalization part 121 from the front end thereof. The slots 151–154 are provided at locations which are spaced circumferentially by uniform angular intervals of 90°. The portions of the athermalization part 121 located between the slots 151–154 serve as four resilient arms 161–164, which each project axially and forwardly. A respective portion of the groove 149 extends transversely across each of the arms 161–164, such that the arms are each slightly thinner at the groove 149 than elsewhere, which in turn facilitates resilient flexibility of each arm.

Figure 6:
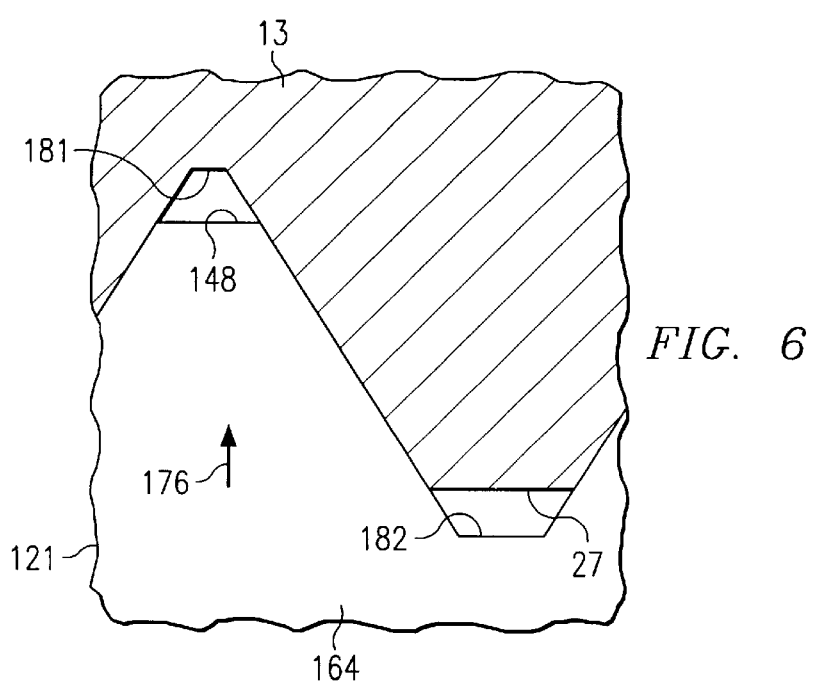
FIG. 6 is a diagrammatic fragmentary sectional side view that depicts, in a substantially enlarged scale, a portion of the view of FIG. 2.

Turning now in more detail to the cooperating threads 27 and 148, FIG. 6 is a diagrammatic fragmentary sectional side view which is a portion of the view of FIG. 2, but which shows the cooperating threads 27 and 148 in a significantly larger scale. It will be noted from FIG. 6 that the threads 27 and 148 are configured so that, when engaged, the tip of the thread 148 is spaced somewhat from the inner end of the groove 181 associated with thread 27, and the tip of thread 27 is spaced somewhat from the inner end of the groove 182 associated with thread 148.

The housing 12 and the athermalization part 121 are configured so that, prior to assembly of the apparatus 10, the threads 148 on the athermalization part 121 have a maximum major diameter which is greater than the maximum major diameter of the threads 27 on the housing 12. This is commonly known in the art as an interference fit. In the absence of the slots 151–154 in the athermalization part 121, it would be difficult or impossible to screw the threads 27 and 148 together, due to the interference fit. However, as a result of the slots 151–154, the outer ends of the arms 161–164 can each flex radially inwardly a small distance, thereby permitting the threads 27 and 148 to be screwed together despite the fact their initial diameters define an interference fit.

Thus, in the assembled apparatus 10 which is depicted in FIG. 2, the four arms 161–164 are all flexed radially inwardly a small amount, and continuously resiliently urge the threads 148 thereon radially outwardly into engagement with the threads 27 provided on the housing 12, as indicated diagrammatically by arrow 176 in FIG. 6. Consequently, and as shown in FIG. 6, the thread 148 on the athermalization part 121 has surfaces on both sides thereof that are always engaged with respective side surfaces of the thread 27 on the housing 12. Of course, this inherently means that the opposite side surfaces on the thread 27 are each engaging respective side surfaces of the thread 148. Due to this engagement of sidewalls, which is continuously maintained by the force 176, there is never any axial "backlash" between the threads 148 and 27, and thus no possibility for axial play between the housing 12 and the athermalization part 121.

Changes in temperature may cause a small amount of radial expansion or contraction of the housing 12 and the athermalization part 121, which can effectively alter the initial diameter of each (before the threads 27 and 148 are engaged). However, the resilience of the arms 161–164 will absorb any such radial variations in size, while keeping the side surfaces of the threads 148 and 27 in firm engagement, in the manner shown in FIG. 6. Similarly, to the extent that manufacturing tolerances in radial directions can accumulate in a manner that would theoretically create binding between the interference fit threads, the resilience of the arms 161–164 will effectively absorb any such accumulated tolerances, while keeping the side surfaces of the threads 148 and 27 in firm engagement.

A brief explanation will now be provided as to how the apparatus 10 is assembled. The smaller lens 72 is placed in the recess 71 of the lens support 51, and then a quantity of the potting compound 74 is placed in the groove 73, in order to hold the lens 72 in place. Next, the larger lens 67 is placed in the recess 66, and the potting compound 69 is added in the groove 68, in order to hold the lens 67 in place. The athermalization part 121 is then loosely coupled to the lens support 51 using four screws, which include the two illustrated screws 137 and 138. These four screws are not yet fully tightened. As discussed above, the openings 131–134 are slightly larger in diameter than the outside diameter of the threads on the screws. Therefore, at this point in the assembly process, a degree of play exists in all radial directions between the athermalization part 121 and the lens support 51.

The athermalization part 121 and lens support 51 are then inserted into the housing 12. A not-illustrated tool is manually moved into engagement with the recesses 63 and 64 in the lens support 51. This tool is then used to manually rotate the lens support 51 and athermalization part 121 about the axis 11 with respect to the housing 12, in order to screw the threads 27 and 148 into engagement with each other. As discussed above in association with FIG. 6, the arms 161–164 each flex radially inwardly as the threads 27 and 148 become engaged, and thereafter serve to continuously and resiliently urge the threads 148 into engagement with the threads 27, in a manner avoiding any axial backlash between the threads. While the threads 27 and 148 are becoming engaged with each other, the guide surfaces 53 and 54 on the lens support 51 move into sliding engagement with the guide surfaces 23 and 24 on the housing 12.

As noted above, a small amount of play exists in all radial directions between the athermalization part 121 and the lens support 51, because the screws which couple them together have not yet been tightened. Consequently, once the guide surfaces 23 and 53 have become engaged with each other, thereby effecting radial positioning of the rear end of the lens support 51 with respect to the housing 12, the rear end of the athermalization part 121 can move radially with respect to the rear end of the lens support 51, until the rear end of the lens support 121 is in a position where, after the screws are tightened, it will not tend to exert a radial force in any direction on the rear end of the lens support 51. With the rear ends of the lens support 51 and athermalization part 121 thus properly positioned in relation to each other, the screws which couple their rear ends can be tightened, in the following manner.

The lens support 51 is rotated to a position in which the screws 137 and 138 are angularly aligned with the slots 18 and 19 in the end wall 14 of the housing 12. A standard screwdriver is then inserted successively through each of the slots 18 and 19, and is used to manually tighten the screws 137 and 138. The lens support 51 is then rotated 90° about the axis 11, so that the other two screws become aligned with the slots 18 and 19. The screwdriver is then used to successively tighten these other two screws.

Assembly of the apparatus 10 is at this point completed. However, the following additional steps are carried out in order to install the apparatus 10 in a system. The lens support 51 and athermalization part 121 are rotated with respect to the housing 12 so as to disengage the threads 148 from the threads 27, and the lens support 51 and athermalization part 121 are axially withdrawn from the housing 12. The four screws which secure the lens support 51 to the athermalization part 121, including screws 137 and 138, are not loosened again. The housing 12 is then fixedly mounted within a not-illustrated system, using not-illustrated screws which each extend through a respective one of the slots 18–19, and/or through additional openings 186–187 (FIG. 3) provided in the rear wall 14 of the housing 12, in order fixedly secure the rear wall 14 to a not-illustrated part of the system. After the housing 12 has been fixedly secured within the system, the lens support 51 and athermalization part 121 are axially re-inserted into the housing 12, and are rotated relative to the housing 12 in order to effect engagement of the threads 127 and 148. Then, during a final optical calibration procedure, the lens support 51 and the athermalization 121 are rotated relative to the housing 12 in order to adjust the lenses 67 and 72 to an axial position which achieves proper focus within the overall optical system for the infrared radiation that passes through the apparatus 10. The threads 27 and 148 thus serve to provide initial focus adjustment. Friction between the threads 27 and 148, including that produced by the resilience of the arms 161–164, resists relative rotation of the lens support 51 and housing 12 that would tend to change this initial focus adjustment.

A brief explanation will now be provided regarding the thermal compensation which occurs within the apparatus 10 in response to a temperature change. As mentioned above, changes in temperature cause changes to optical characteristics of the optical system. In this regard, one significant factor is that a change in temperature causes a change in the index of refraction of each of the germanium lenses 67 and 72, which in turn can change their focusing function in a manner causing an axial shift in the focal plane of the image that they generate.

In order to provide temperature-based compensation to counteract this type of change in optical characteristics, the athermalization part 121 has a coefficient of thermal expansion which causes it to respond to a temperature change by expanding or contracting in axial length, so as to effect sliding movement of the lens support 51 relative to the stationary housing 12. The apparatus 10 is designed so that the amount of such axial expansion or contraction effects axial repositioning of the lenses 67 and 72 by an amount that accurately counteracts thermal factors such as the variation in the indexes of refraction of the lenses 67 and 72. Consequently, despite the temperature change, the focal plane of the image produced by the lenses 67 and 72 remains at substantially the same axial location in the system, thereby assuring accurate and reliable optical operation of the apparatus 10 over a relatively wide temperature range.

Figure 7:
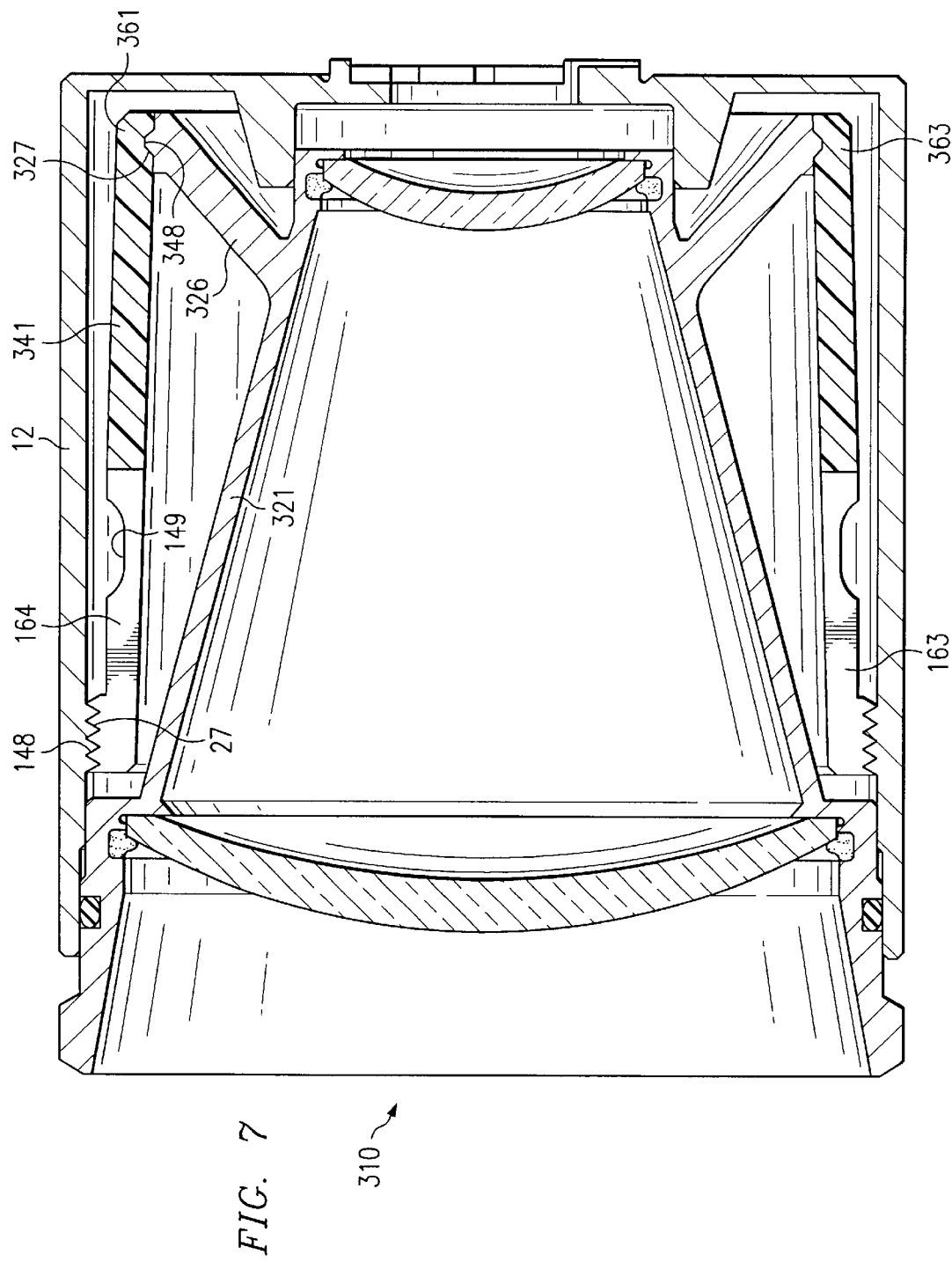
FIG. 7 is a diagrammatic sectional side view similar to FIG. 2, but showing an optical apparatus which is an alternative embodiment of the apparatus of FIG. 2.

FIG. 7 is a diagrammatic sectional side view similar to FIG. 2, but showing an optical apparatus 310 which is an alternative embodiment of the apparatus 10 of FIG. 2. The apparatus 310 of FIG. 7 is generally similar to the apparatus 10 of FIG. 2, and only significant differences are discussed in detail below. These differences relate primarily to the structure of the athermalization part, and the manner in which the athermalization part is coupled to the lens support.

In more detail, the apparatus 310 includes a lens support 321 having at the rear end thereof a radially outwardly projecting annular flange 326, which is different from the flange 82 provided at the rear of the lens support 51 of FIG. 2. More specifically, the flange 326 does not have threaded openings through it, but instead has at the outer end thereof a circumferential rib 327 which projects radially outwardly. The rib 327 has a cross-sectional shape which is approximately trapezoidal.

Figure 8:
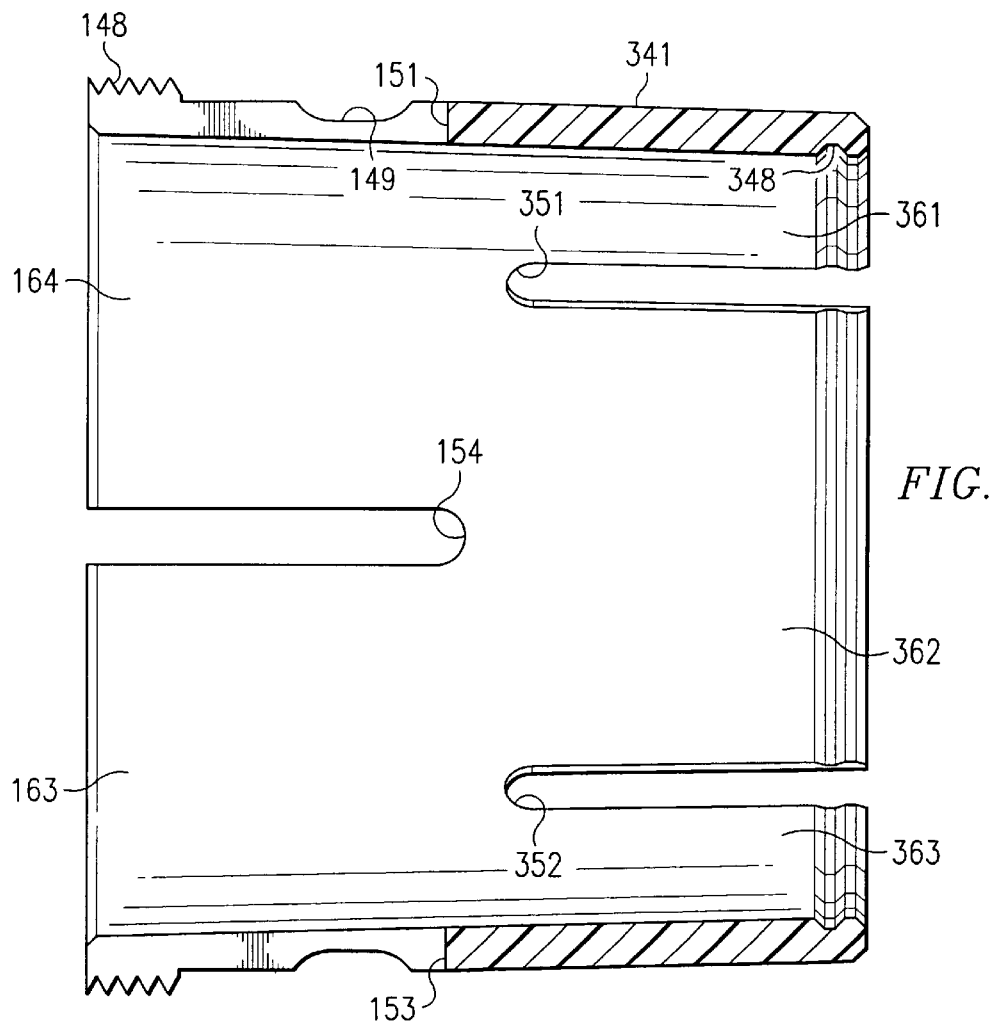
FIG. 8 is a diagrammatic sectional side view of an athermalization part which is a component of the apparatus of FIG. 7.

The apparatus 310 of FIG. 7 includes an athermalization part 341, and FIG. 8 is a diagrammatic sectional side view of the athermalization part 341. The athermalization part 341 differs in some respects from the athermalization part 121 of the apparatus 10, as discussed in more detail below.

The athermalization part 341 is a tube that is approximately cylindrical, but more precisely is frustoconical, in that it tapers very gradually in diameter from its front end to its rear end. As evident from FIGS. 7 and 8, the left or front half of the athermalization part 341 is generally similar to the left or front half of the athermalization part 121 of FIGS. 2 and 4. In particular, it has the circumferentially extending thread 148 which is configured for an interference fit with the thread 27 on the housing 12, in order to physically couple the athermalization part 341 and the housing 12. Further, it has the circumferentially extending groove 149. In addition, four slots extend axially into the athermalization part 341 from the front end thereof, three of these slots being visible in FIG. 8 at 151 and 153–154. These slots are offset from each other by interval of 90°. The four slots define four resilient arms, two of which are visible in FIGS. 7–8 at 163 and 164.

The right or rear half of the athermalization part 341 differs in structure from the right or rear half of the athermalization part 121 of FIG. 2. More specifically, on an inner surface at the rear end thereof, the athermalization part 341 has a circumferentially extending groove 348. The groove 348 has a cross-sectional shape which is approximately trapezoidal. The groove 348 receives the rib 327 provided on the flange 326 of the lens support 321, in order to physically couple the lens support 321 and the athermalization part 341. The cooperation between this rib and groove is discussed in more detail later. Four slots, two of which are visible at 351 and 352, extend axially and forwardly into the athermalization part 341 from the rear end thereof. These four slots are provided at circumferentially spaced locations which are offset from each other by uniform angular intervals of 90°. These four slots in the rear half of the athermalization part 341 are angularly offset by 45° from the four slots in the front half thereof. The portions of the athermalization part 341 located between the slots serve as four axially rearwardly projecting arms which are each resiliently flexible, three of these arms being visible in FIG. 8 at 361–363.

Figure 9:
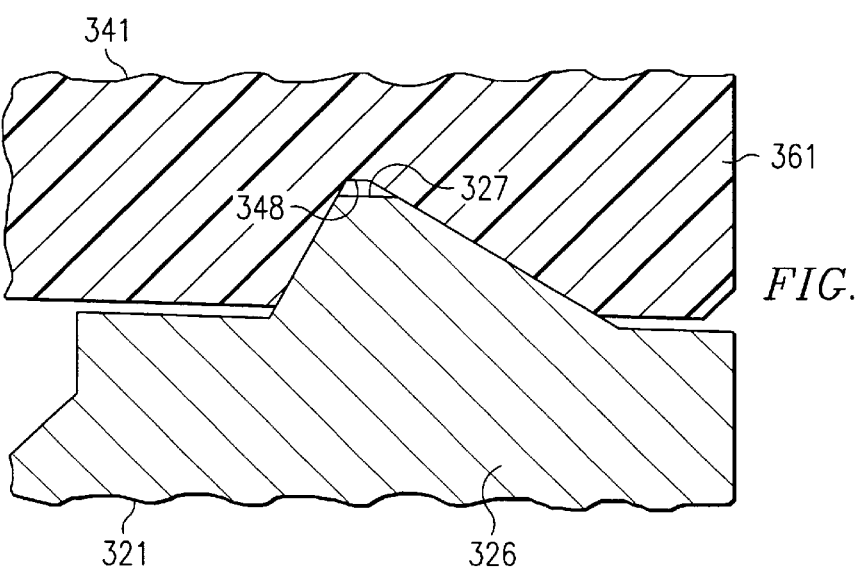
FIG. 9 is a diagrammatic fragmentary sectional side view that depicts, in a substantially enlarged scale, a portion of the view of FIG. 7.

FIG. 9 is a diagrammatic fragmentary sectional side view which shows, in a significantly enlarged scale, a portion of the view of FIG. 8 that includes the rib 327 and groove 348. The major diameter of the rib 327 is greater than the major diameter of the groove 348, such that the rib 327 and groove 348 are subject to an interference fit which is comparable to the interference fit discussed above in association with the threads 27 and 148. Consequently, when the rib 327 is received within the groove 348 in the assembled configuration shown in FIGS. 7 and 9, the four resiliently flexible arms at the rear end of the athermalization part 341 are each in a radially outwardly flexed position, and therefore each have the effect of continuously and resiliently urging the rib 327 and the groove 348 into engagement with each other.

It will be noted from FIG. 9 that the outer end of the rib 327 and the innermost surface of the groove 348 are spaced slightly from each other, and that the facing surfaces on the flange 326 and the athermalization part 341 are spaced slightly from each other. Consequently, due to the resilience of the four flexible arms, including arms 361–363, the slanted surfaces on opposite sides of the groove 348 are always being resiliently urged into engagement with the slanted surfaces on opposite sides of the rib 327. This ensures that there is no axial play or backlash between the lens support 321 and the athermalization part 341. Even if the diameters of the lens support 321 and/or the athermalization part 341 change somewhat in response to temperature variations, the resilience of the arms serves to maintain this zero backlash engagement between the rib 327 and the groove 348. It will be noted that this zero backlash engagement is achieved with an inexpensive and structurally simple configuration.

During assembly, the flange 326 on the lens support 321 is inserted into the athermalization part 341 in a rearward direction, and causes the four arms 361–363 at the rear end of the athermalization part 341 to be flexed outwardly by the rib 327, until the rib 327 becomes axially aligned with the groove 348. The arms then snap radially inwardly under their own resilience as the rib 327 enters the groove 348, but even after that the arms each remain resiliently flexed to some degree. The housing 12 is then mounted in some suitable manner in a not-illustrated system. After that, the athermalization part 341 and the lens support 321 are inserted axially into the housing 12, and are rotated relative to the housing 12 so as to effect engagement of the threads 27 and 148. As the threads 27 and 148 become engaged, the arms at the front end of the athermalization part 341 flex radially inwardly, in a manner similar to that already described in detail in association with the embodiment of FIGS. 1–6.

Once the threads 27 and 148 are engaged, the lens support 321 and athermalization part 121 are rotated relative to the housing so as to position the lenses 67 and 72 in an axial position which effects proper focusing of infrared radiation. Thereafter, during normal operational use of the apparatus 310, the athermalization part 341 effects compensation in response to a temperature change by moving the lens support axially with respect to the housing 12, in a manner substantially identical to that described above for the athermalization part 121 in the embodiment of FIGS. 1–6.

The present invention provides a number of technical advantages. These technical advantages include the provision of a single athermalization part which is relatively simple in structure, and which facilitates passive focus compensation, initial focus adjustment, self-locking of the focus adjustment, zero backlash in the focus adjustment, loose manufacturing tolerances, and ease of assembly. A related advantage is that the zero backlash condition remains fully effective across a wide operational temperature range of the apparatus. Another advantage results from the use of several resilient arms that provide an almost constant radial force within the structure that effects zero backlash and focus adjustment locking, and that provide radial compliance while maintaining axial stiffness. The radially distributed forces also facilitate self centering of mating surfaces in the zero backlash structure.

Yet another advantage results where the athermalization part is a tube which is positioned approximately concentric to the axis of a lens that needs axial repositioning in response to temperature variations. The athermalization part is configured to apply forces uniformly around a lens cell that supports the lens, so as to reduce or avoid any tendency toward tilting and/or binding of the lens cell. Still another advantage results from the provision of a configuration which can reliably maintain the proper axial position of the lenses, even when the apparatus is subjected to vibration or shock. Another advantage is that there are no setscrews in the structure which implements zero backlash and focus locking functions.

Although two embodiments have been illustrated and described in detail, it will be understood that various substitutions and alterations are possible without departing from the spirit and scope of the present invention, as defined by the following claims.

What is claimed is:

1. An apparatus, comprising:

first and second parts capable of relative movement parallel to a first direction, said first part including a section having thereon a coupling structure which faces in a second direction approximately transverse to said first direction;

an optical component which is part of an optical system and which is supported on one of said first and second parts; and a compensation part operatively coupled to said second part and including a section having thereon a coupling structure which faces and operatively engages said coupling structure on said first part, said compensation part having a coefficient of thermal expansion which causes said compensation part to respond to a temperature change by undergoing a size change that effects relative movement of said first and second parts parallel to said first direction by an amount which compensates for a variation in optical characteristics of the optical system caused by the temperature change;

a first of said sections having thereon a first of said coupling structures and a second of said sections having thereon a second of said coupling structures, said first section being resilient, and being flexed so as to continuously resiliently urge said first coupling structure against said second coupling structure in a direction approximately parallel to said second direction.

2. An apparatus according to claim 1, wherein said part with said second section includes a plurality of coupling portions which are spaced circumferentially about an axis extending parallel to said first direction, and which each face in a respective radial direction; and wherein said part with said first section includes a plurality of resilient arms which are spaced circumferentially about said axis, which each have adjacent an outer end thereof a coupling portion facing in a respective radial direction, and which are each flexed so as to resiliently urge said coupling portion thereon into engagement with a respective one of said coupling portions on said part with said second section;

said first section and said first coupling structure being one of said arms and said coupling portion thereon, and said second coupling structure being one of said coupling portions on said part with said second section.

3. An apparatus according to claim 2, wherein said coupling portions each include threads, said threads being responsive to relative rotation about said axis of said first part and said compensating part for effecting relative movement of said first part and said compensating part parallel to said axis.

4. An apparatus according to claim 3, wherein said threads are shaped so that, in response to the resilient urging of said arms, said threads on said compensating part and said threads on said first part are urged into engagement in a manner providing zero backlash in directions parallel to said axis.

5. An apparatus according to claim 3, wherein said resilience of said arms produces, between said threads on said compensating part and said threads on said first part, friction which resists relative rotation of said compensating part and said first part.

6. An apparatus according to claim 2, wherein said coupling portions on one of said first part and said compensating part each include a rib, and said coupling portions on the other of said first part and said compensating part each include a groove which receives a respective said rib.

7. An apparatus according to claim 6, wherein said ribs and said grooves are shaped so that, in response to the resilient urging of said arms, said ribs and said grooves are urged into engagement in a manner providing zero backlash in directions parallel to said axis.

8. An apparatus according to claim 2, wherein said optical part is a lens, said axis being an optical axis of said lens.

9. An apparatus according to claim 2, wherein said part with said arms includes an annular section which extends concentrically around said axis, said arms projecting approximately axially from said annular section.

10. An apparatus according to claim 2, wherein said coupling portion on each said arm is urged by that arm against the corresponding coupling portion on said part having said second section with a force that remains approximately constant across an operational temperature range of said apparatus.

11. An apparatus according to claim 2,
wherein said first part has thereon an axially extending first guide surface, and
wherein said second part has thereon an axially extending second guide surface which slidably engages said first guide surface to guide said first and second parts with respect to each other during relative axial movement thereof.

12. A method, comprising the steps of:
supporting first and second parts for relative movement parallel to a first direction, said first part including a section having thereon a coupling structure which faces in a second direction approximately transverse to said first direction;
providing on one of said first and second parts an optical component which is part of an optical system;
compensating for variation in optical characteristics of the optical system due to temperature changes by providing a compensation part which is operatively coupled to said second part and which includes a section having thereon a coupling structure that faces and operatively engages said coupling structure on said first part, a first of said sections having thereon a first of said coupling structures and a second of said sections having thereon a second of said coupling structures, said compensation part having a coefficient of thermal expansion which causes said compensation part to respond to a temperature change by undergoing a size change that effects relative movement of said first and second parts parallel to said first direction by an amount which compensates for the variation in optical characteristics of the optical system caused by the temperature change; and
causing said first section to continuously resiliently urge said first coupling structure against said second coupling structure in a direction approximately parallel to said second direction.

13. A method according to claim 12, including the steps of:
configuring said part with said second section to include a plurality of coupling portions which are spaced circumferentially about an axis extending parallel to said first direction, and which each face in a respective radial direction; and
configuring said part with said first section to include a plurality of resilient arms which are spaced circumferentially about said axis, which each have adjacent an outer end thereof a coupling portion facing in a respective radial direction, and which are each flexed so as to resiliently urge said coupling portion thereon into engagement with a respective one of said coupling portions on said part with said second section, said first section and said first coupling structure being one of said arms and said coupling portion thereon, and said second coupling structure being one of said coupling portions on said part with said second section.

14. A method according to claim 13, including the step of configuring said coupling portions on each of said compensating part and said first part so that, in response to the resilient urging of said arms, said coupling portions on said compensating part and said first part are urged into engagement in a manner providing zero backlash in directions parallel to said axis.

15. A method according to claim 13, wherein said step of configuring said part with said first section includes the step of configuring each said arm so that said coupling portion thereon is urged by that arm against the corresponding coupling portion on said part having said second section with a force that remains approximately constant across an operational temperature range of said apparatus.

* * * * *